United States Patent
Lim et al.

(10) Patent No.: US 11,535,102 B2
(45) Date of Patent: Dec. 27, 2022

(54) DIGITAL INSTRUMENT DISPLAY METHOD OF VEHICLE AND APPARATUS THEREOF

(71) Applicant: GrapiCar Inc., Seoul (KR)

(72) Inventors: Seyoung Lim, Seoul (KR); Dongsu Shin, Seoul (KR); Jeonghun Ko, Seoul (KR)

(73) Assignee: GRAPICAR INC., Seoul (KR)

( * ) Notice: Subject to any disclaimer, the term of this patent is extended or adjusted under 35 U.S.C. 154(b) by 0 days.

(21) Appl. No.: 17/079,884

(22) Filed: Oct. 26, 2020

(65) Prior Publication Data
US 2021/0221225 A1   Jul. 22, 2021

(30) Foreign Application Priority Data
Jan. 16, 2020   (KR) .......... 10-2020-0005809

(51) Int. Cl.
*B60K 35/00* (2006.01)
*G06T 11/20* (2006.01)
*G06T 13/80* (2011.01)

(52) U.S. Cl.
CPC .......... *B60K 35/00* (2013.01); *G06T 11/20* (2013.01); *G06T 13/80* (2013.01); *B60K 2370/20* (2019.05)

(58) Field of Classification Search
None
See application file for complete search history.

(56) References Cited

U.S. PATENT DOCUMENTS

| 8,787,660 B1* | 7/2014 | Simon .............. G06K 9/6828 |
| | | 382/161 |
| 2012/0105472 A1* | 5/2012 | Oi .................. G06F 3/0482 |
| | | 345/619 |
| 2020/0357169 A1* | 11/2020 | Casella .......... G06F 3/0488 |

FOREIGN PATENT DOCUMENTS

KR    10-0906245 B1    7/2009

* cited by examiner

*Primary Examiner* — Jason A Pringle-Parker
(74) *Attorney, Agent, or Firm* — LRK Patent Law Firm (57) ABSTRACT

A digital instrument display method includes generating bitmap font image and font table for font; running application module; running graphic engine module; running content module; transmitting, by sensor unit attached to vehicle, the generated signals to application module; analyzing, by application module, information received, and generating external event data; reading, by content module, external event data stored in internal memory for each frame and determining whether data are character string output; if data are character string output, transmitting, by content module, corresponding character string information to graphic engine module; acquiring, by graphic engine module, position and size information of bitmap font image that matches character string in bitmap font table; and copying, by control unit, position and size information of bitmap font image that matches character string acquired and displaying character string through instrument display unit using graphic engine module and graphic library.

9 Claims, 10 Drawing Sheets

Search Priority for Rendering

0xAC00_0xACFF.png

0xB000_0xB0FF.png

DIGITAL INSTRUMENT DISPLAY METHOD OF VEHICLE AND APPARATUS THEREOF

CROSS-REFERENCE TO RELATED APPLICATION

This application claims priority to Korean Patent Application No. 10-2020-0005809, filed Jan. 16, 2020, the disclosure of which is incorporated herein by reference for all purposes.

BACKGROUND

1. Technical Field

The present invention relates to a method of embodying text or image on a digital instrument used in vehicles and supports various foreign languages, including easy display of complex foreign languages with many kinds of characters.

2. Description of Related Art

Figure 1:
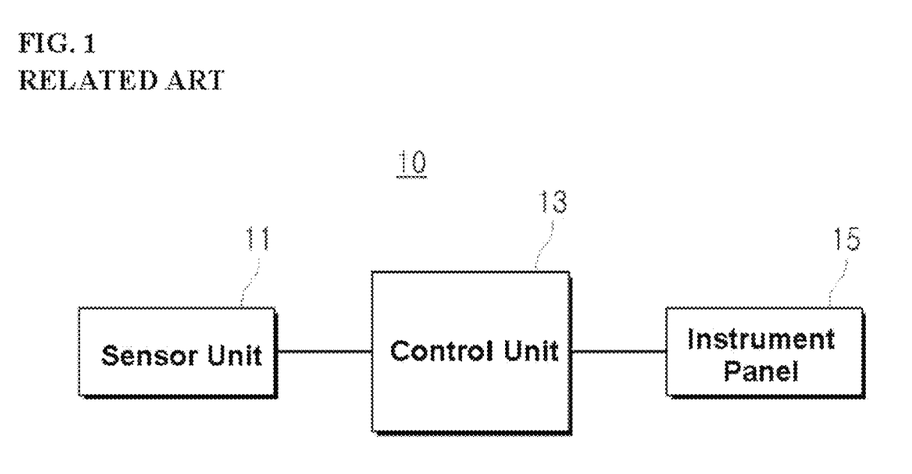
FIG. 1 is a block diagram of conventional instrument display apparatus of vehicle

The related art of this invention is presented in the registered patent no. 10-0906245 of the Republic of Korea. FIG. 1 is a block diagram of the conventional instrument display apparatus of vehicle. In FIG. 1, the conventional instrument display apparatus of vehicle comprises sensor unit (11), control unit (13), and instrument panel (15). Sensor unit (11) senses internal and external circumstances of vehicle. Here, sensor unit (11) is furnished with sensors that sense velocity of vehicle, revolutions per minute, engine temperature, fuel gauge, driving distance, status of transmission, residual fuel, door opening and closing, lighting, and reverse drive. Control unit (13) performs a function of controlling overall operation of vehicle. Also, control unit (13) controls display operation of vehicle instrument. Also, control unit (13) senses vehicle information changed by sensor unit (11), differentially applies vehicle information according to degree of importance, and displays vehicle information on instrument panel (15). Here, vehicle information is displayed on specific position of instrument securing visibility and recognition of drivers according to degree of importance. Degree of importance of vehicle information is determined based on degree of relevance to driver's life and arrival of dangerous level of vehicle information. Also, control unit (13) decides and displays icons that correspond to display position or vehicle information according to degree of importance of vehicle information. Also, control unit (13) controls display icons to flicker according to degree of importance of vehicle information. Instrument panel (15) displays vehicle information under control of the control unit (13). Also, instrument panel (15) displays vehicle information while varying display position of vehicle information according to degree of importance.

SUMMARY OF THE INVENTION

The conventional art has an advantage of displaying data generated by each sensor installed on vehicle in a position that can secure good visibility of driver according to degree of importance, but there is a disadvantage of having to store position and size information of each text image in an MCU internal memory for text display. Also, since capacity of the MCU internal memory is limited for displaying languages that have many characters like Chinese and Korean and a separate memory must be secured to run application, a memory shortage problem occurs. Also, the conventional art has following problems. First, size of font table can increase in proportion to number of characters to be used, each character requires at least 8 bytes, internal memory usage increases for languages that have many characters, and there are clear limitations if size of internal memory is fixed. Second, a search algorithm must be applied to shorten search time, and the search algorithm increases internal memory usage. Third, when making changes in batch such as text color, character search on font table and screen display must be repeated. Lastly, there is a problem of having to spend same time and cost again to redisplay screen. Therefore, the purpose of this invention is to provide a method of font use that can maintain performance while minimizing MCU internal memory usage.

Digital instrument display method of vehicle with the purpose above comprises: A step in which bitmap font image and font table are generated for font to be used and stored in external storage memory before CPU runs application module; a step in which CPU runs application module; a step in which application module runs graphic engine module; a step in which graphic engine module runs and operates content module; a step in which sensor unit attached to vehicle transmits generated signals to application module when digital instrument display apparatus is operated; a step in which application module analyzes information received, generates external event data that have information identifier and value, and stores data in internal memory; a step in which content module reads external event data stored in internal memory for each frame and determines whether data are character string output; a step in which, if data are character string output, content module transmits corresponding character string information to graphic engine module; a step in which graphic engine module acquires position and size information of bitmap font image that matches character string in bitmap font table stored in external storage memory; and a step in which control unit copies position and size information of bitmap font image that matches character string acquired and displays character string through instrument display unit using graphic engine module and graphic library.

Advantageous Effects

Digital instrument display method of vehicle of this invention comprised as above has an effect of displaying characters using minimum MCU internal memory and shortens search time of character or character string regardless of number of characters in languages such as Chinese with over 20,000 characters.

DETAILED DESCRIPTION OF THE INVENTION

Digital instrument display method of vehicle and apparatus thereof of this invention with the purpose above can be explained based on FIG. 2 through 11 as below.

Figure 2:
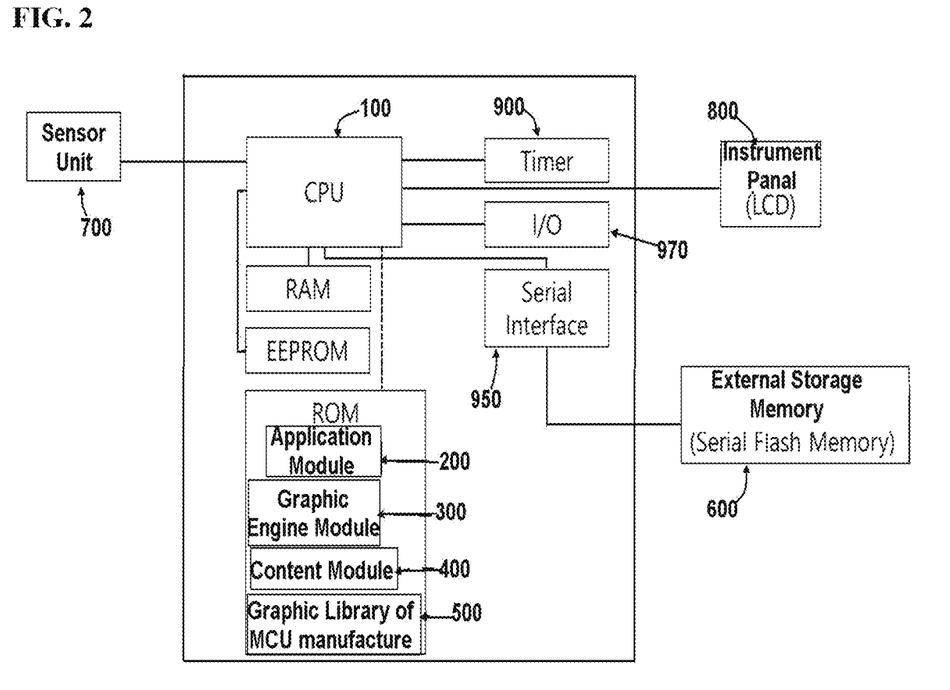
FIG. 2 is a block diagram of digital instrument display apparatus of vehicle of this invention.

FIG. 2 is a block diagram of digital instrument display apparatus of vehicle of this invention. In FIG. 2, digital instrument display apparatus of vehicle of this invention comprises: CPU (100) that runs application module, copies size and position of bitmap font image that matches character string acquired from external storage memory, and controls to display on instrument display unit using graphic engine module and graphic library or controls to display image information received from content module on instrument panel; application module (200) that runs graphic engine module, receives signals from vehicle sensor unit, generates external event data with information identifier and type (value) by analyzing information received, and stores data in internal memory (RAM, EEPROM); graphic engine module (300) that runs content module, receives character string from content module, acquires position and size information of bitmap font image that matches bitmap font table stored in external storage memory, and receives corresponding image information stored previously from content module; content module (400) that receives external event data stored in internal memory for every frame and determines whether data are character string output, transmits corresponding character string information to graphic engine module if data are character string output, and transmits corresponding image address information stored previously to graphic engine module if data are not character string output; graphic library (500) that stores screen components provided by MCU manufacturer; external storage memory (600) that stores bitmap font image and font table for font to be used; sensor unit (700) that generates information of sensor attached to vehicle and transmits to application module; instrument panel (800) that displays bitmap font image or displays image according to control of control unit; timer (900) that provides time information to CPU; serial interface (950) that provides interface between CPU and external storage memory; and I/O (970) for external data input and output.

Figure 3:
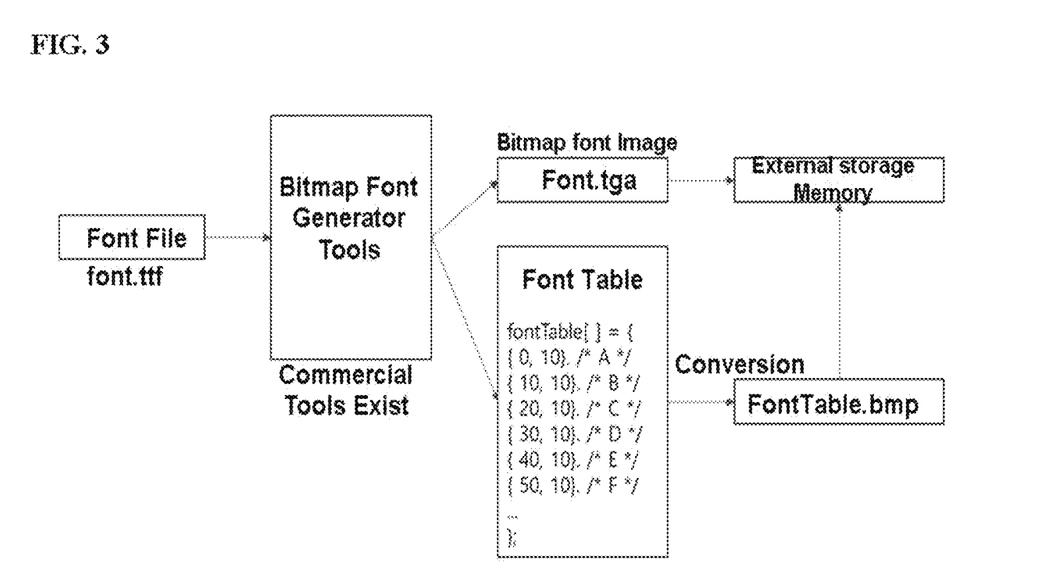
FIG. 3 is an illustration of MCU font use applied to this invention.

FIG. 3 is an illustration of MCU font use applied to this invention. In FIG. 3, MCU font use applied to this invention must convert true type font file to be used into bitmap font image and font table using commercial bitmap font generator. FIG. 3 shows that bitmap font image, a collection of letter image included in font, is stored in external storage memory, and that font table containing position, size, and search information of each letter (character) included in bitmap font image is converted into image to be stored in external storage memory for use.

Figure 4:
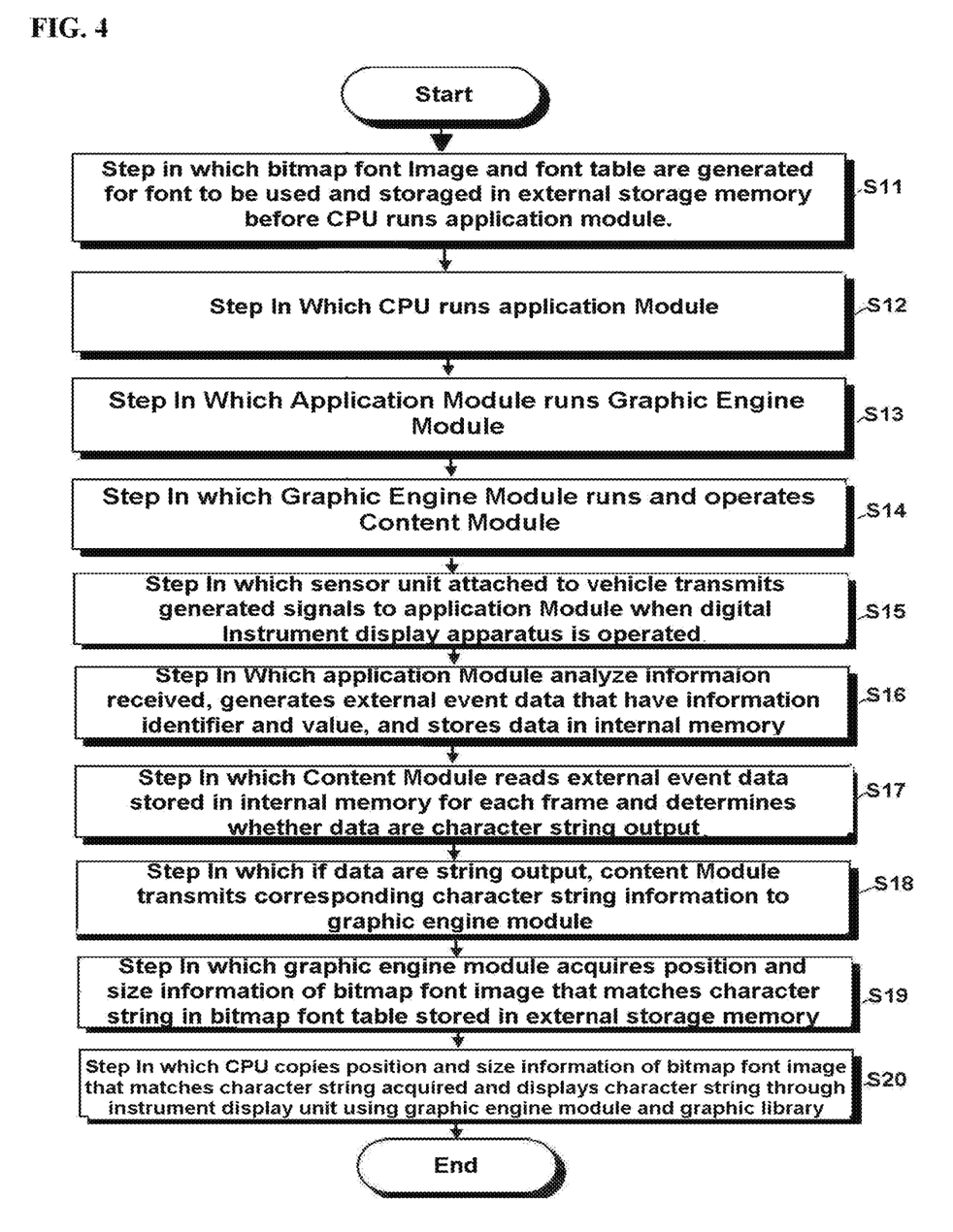
FIG. 4 is a control flow diagram of digital instrument display method of vehicle of this invention.

FIG. 4 is a control flow diagram of digital instrument display method of vehicle of this invention. In FIG. 4, digital instrument display method of vehicle of this invention comprises: A step (S11) in which bitmap font image and font table are generated for font to be used and stored in external storage memory before CPU runs application module; a step (S12) in which CPU runs application module; a step (S13) in which application module runs graphic engine module; a step (S14) in which graphic engine module runs and operates content module; a step (S15) in which sensor unit attached to vehicle transmits generated signals to application module when digital instrument display apparatus is operated; a step (S16) in which application module analyze information received, generates external event data that have information identifier and value (type), and stores data in internal memory; a step (S17) in which content module reads external event data stored in internal memory for each frame and determines whether data are character string output; a step (S18) in which if data are string output, content module transmits corresponding character string information to graphic engine module; a step (S19) in which graphic engine module acquires position and size information of bitmap font image that matches character string in bitmap font table stored in external storage memory; and a step (S20) in which CPU copies position and size information of bitmap font image that matches character string acquired and displays character string through instrument display unit using graphic engine module and graphic library. Also, if data are not character string output in S17, digital instrument display method of vehicle of this invention includes: A step (S21) in which content module transmits corresponding image address information stored previously to graphic engine module; and a step (S22) in which graphic engine module loads and displays on instrument display unit image stored in external storage memory that matches image address information received. Also, for generation of bitmap font image and font table in S11, font table is converted into image containing position information of each bitmap font image. The bitmap font table is converted into image and stored in external storage memory, thereby supporting processing of many letters and minimizing internal memory. Also, in S15, control unit receives generated sensor data from application module and stores data in internal memory as table that has identifier and value. Also, in S18, graphic engine module uses graphic library provided by MCU manufacturer to display screen components managed by content module using internal memory on digital display apparatus screen. Also, when displaying screen components on screen in S18, basic graphic library provided by MCU manufacturer is used. The basic graphic library supports basic graphic process of drawing dot, line, circle, and ellipse and supports additional functions like image expression, layer, and sprite. Also, the content module is a collection of codes that load background image stored in external storage memory (serial flash memory) using API of engine module and instructs generation, arrangement, and change of screen components. Also, for instance if sensor unit in S15 is velocity sensor, signal is generated by sensor unit when velocity change occurs, and external event data transmitted to application module are analyzed and interpreted by application module and stored as data table comprising each type (velocity, RPM) and information in internal memory. Each module stored in the ROM is controlled by CPU and can be interfaced mutually. The character has identical meaning as font.

Figure 5:
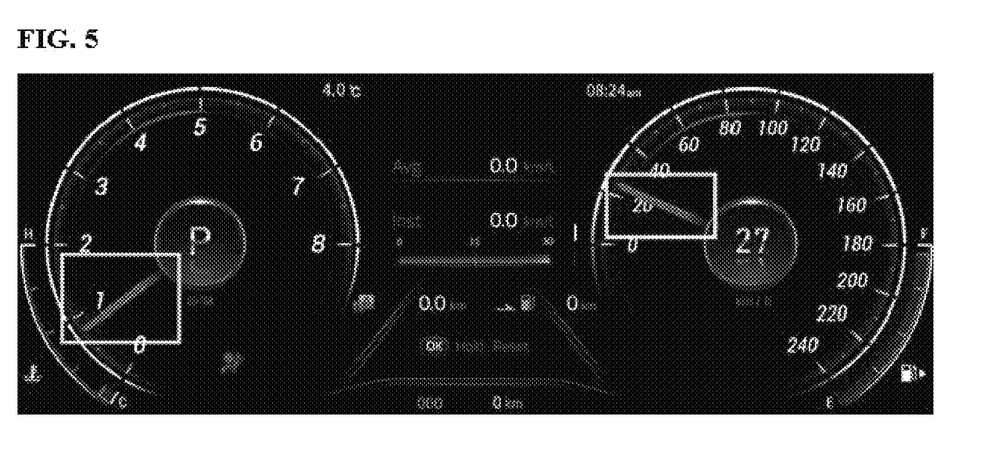
FIG. 5 is a block diagram of digital display apparatus of vehicle of this invention.

FIG. 5 is a block diagram of digital display apparatus of vehicle of this invention. In FIG. 5, digital instrument display apparatus of vehicle applied to this invention creates program that generates and arranges screen components using Application Programming Interface (API) provided by graphic engine module, combines this program with graphic engine module and basic graphic library provided by MCU manufacturer to be stored as one application in ROM (program memory) of MCU, starts operation of cluster application stored in ROM (program memory) through control unit when driver starts vehicle, executes content stored previously, and displays on instrument panel through graphic engine module. In the above, content module stored in ROM of MCU reads sensor data stored in internal memory for each frame, compares data with previously stored information, and reflects change on screen component information managed by content module. Also, screen display processing (rendering) of instrument panel is accomplished by generating and changing screen component in internal memory through embodiment of content module, changing corresponding information in graphic engine module into numerical information that can be received by basic graphic library of MCU manufacturer, and calling functions included in basic graphic library of MCU manufacturer. In the above, changed numerical information is classified into spatial information, geometric information, mesh information, medium information, and effect information. Spatial information refers to information about space where objects to be displayed on screen are arranged. Geometric information refers to information about type of object, including advantage of comprising object type and mesh information meaning link information of corresponding advantage. Medium information refers to information that manages effect information defining color of content.

Figure 6:
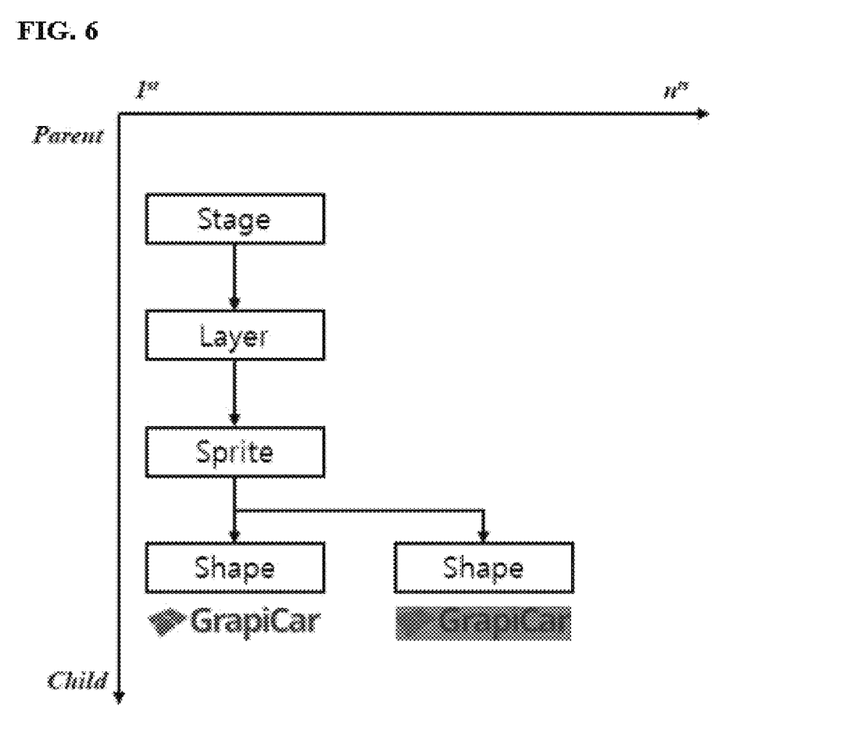
FIG. 6 is a hierarchy diagram of content module to display instrument screen applied to this invention.

FIG. 6 is a hierarchy diagram of content module to display instrument screen applied to this invention. In FIG. 6, content module such as Stage, Layer, Sprite, Shape, and TextField is comprised to display character string through instrument panel applied to this invention. Stage is central module used to manage hierarchy structure of all content modules and has Layer module as child module. Layer has Sprite module as child module, and Sprite is module that manages memory region for information to be drawn on screen. Sprite can have Shape or TextField as child module, stores processing results from Shape or TextField in memory region, and displays on screen. Also, Shape is module that defines image displayed on screen. Image information that can be defined by Shape include position, shape, and color of image. Also, TextField is module that defines letter image using bitmap font applied to this invention. Similar to Shape, TextField defines position, shape, and color of letter image. Also, hierarchy structure of content module prioritizes parent hierarchy to process rending work according to order and first explores child hierarchy that was added first. Screen display process is executed if Shape or TextField is found in the exploration process.

Figure 7:
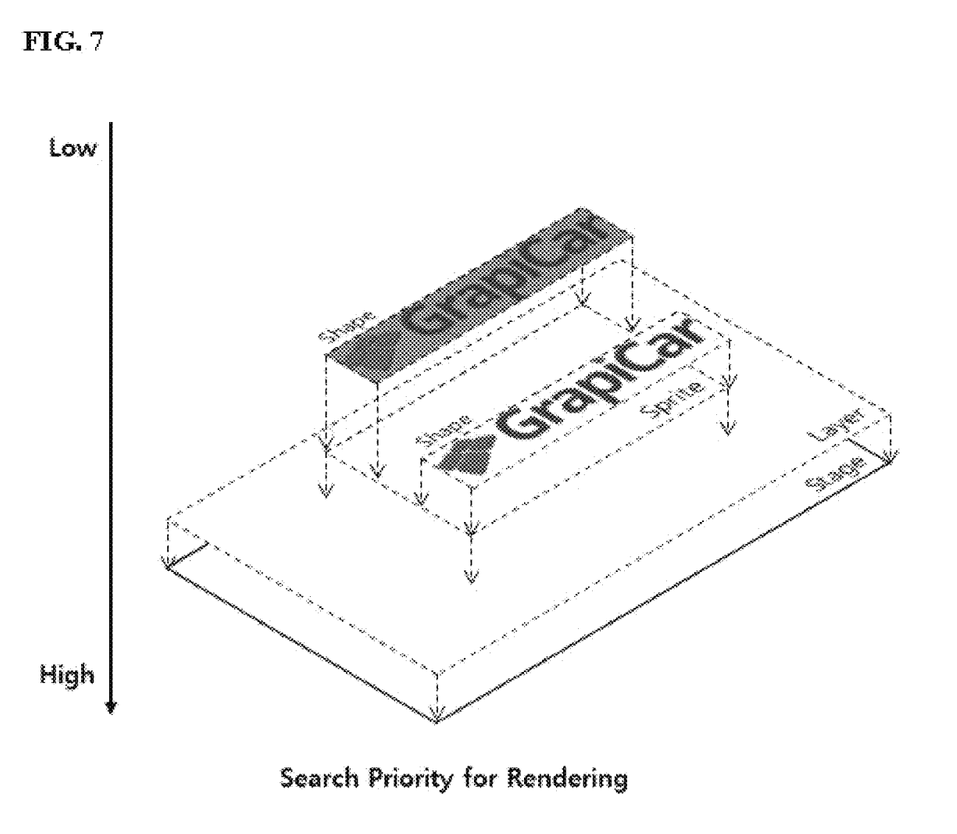
FIG. 7 is a parent hierarchy diagram to display instrument screen applied to this invention.

FIG. 7 is a parent hierarchy diagram to display instrument screen applied to this invention. In FIG. 7, parent hierarchy structure diagram to perform rendering work applied to this invention according to order shows that parent hierarchy must be prioritized to process rending work according to order in hierarchy structure diagram of spatial information. Graphic engine module approaches parent hierarchy structure according to order, calls function of basic graphic library of MCU manufacturer based on graphic information included in each screen component, and requests screen display.

Figure 8:
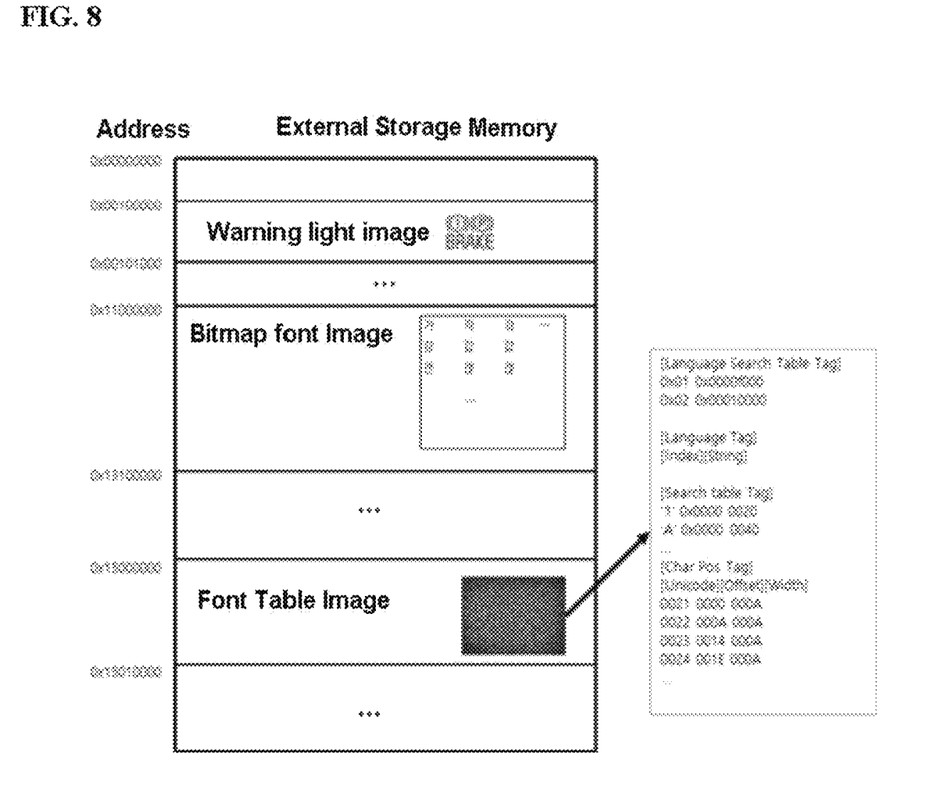
FIG. 8 is a brief illustration of font table image and bitmap font image stored in external storage memory applied to this invention.

FIG. 8 is a brief illustration of font table image and bitmap font image stored in external storage memory applied to this invention. FIG. 8 relates to character string image applied to this invention. Explaining in detail, character 'Gab' is 0xAC11 in Unicode and belongs to Korean code range (0xAC00-0xD7AF). Also, as in FIG. 9, this character belongs to image file range of first divided page (0xAC00-0xACFF). When graphic engine module tries to display 'Gab' (0xAC11) data on screen, font table image stored in external storage memory is loaded to interpret information. Position and size information of each letter stored in bitmap font image is acquired. Bitmap font image that includes target character image is loaded to acquire actual character image through position and size information acquired from font table. Referring to FIG. 8, address of bitmap font image for character 'Gab' is 0x11000000, and address of font table is 0x15000000. Also, position index must be searched to find coordinate information of target character on font table, and search equation is as follows.

Index search equation=(Unicode value of target character)−(First value of page range)

(ex, 0xAC11-0xAC00=0x11)

The index is used to find position that includes coordinate information of target character on font table, and header position can be found as follows.

Header position of target character=Starting address of bitmap font image+(Index*Header size)

(ex, 0x13000000+(0x11+16 byte))

Font table information of character 'Gab' includes image coordinate information (offset_x, offset_y, width, height) within bitmap font image. This information is used to explore as shown in FIG. 10 and find image of target character to be copied. In the above, header size is size of information of each letter included in font table, and unit is in byte. Header size is not fixed because it can differ according to work details and scope.

Figure 9:
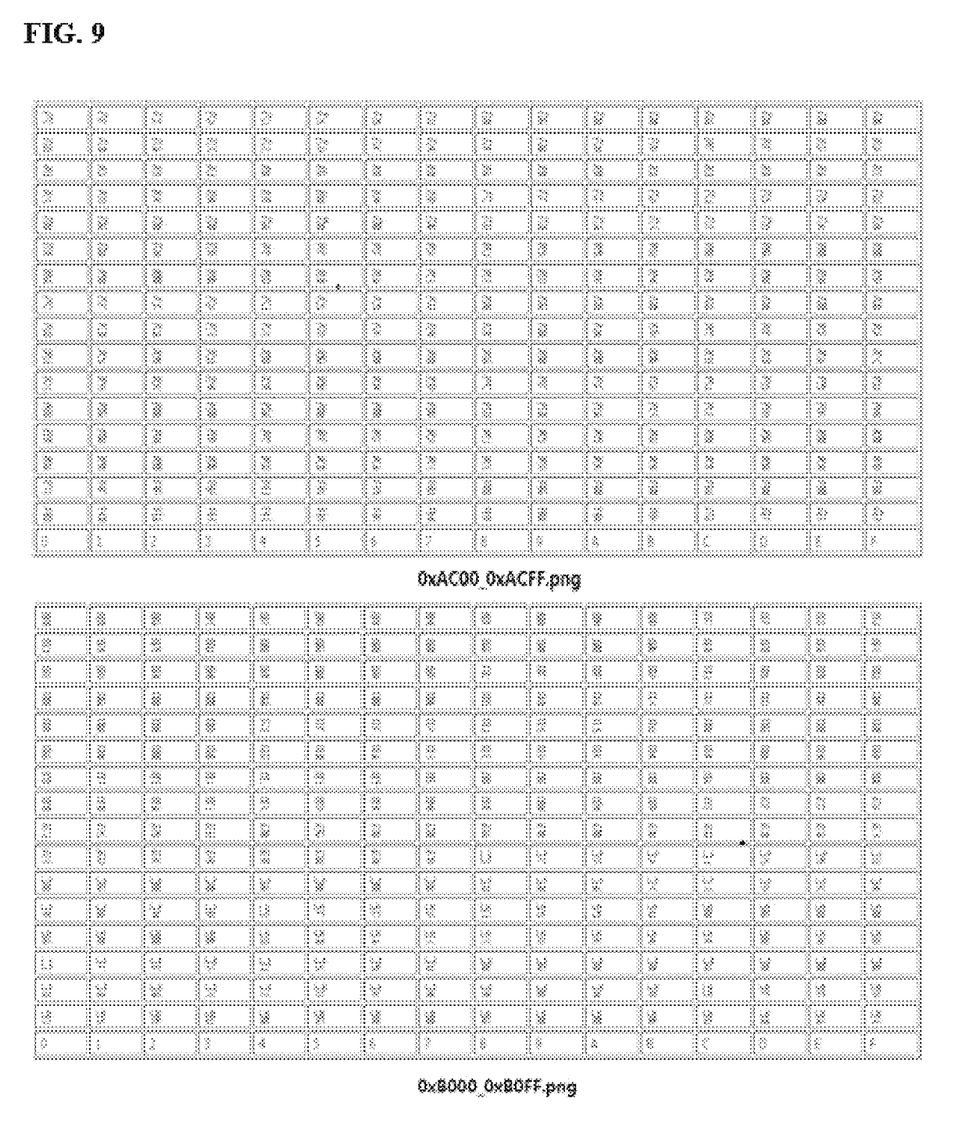
FIG. 9 is an illustration of character string image applied to this invention, stored as image file by dividing code for Korean language in Unicode into pages.
Figure 10:
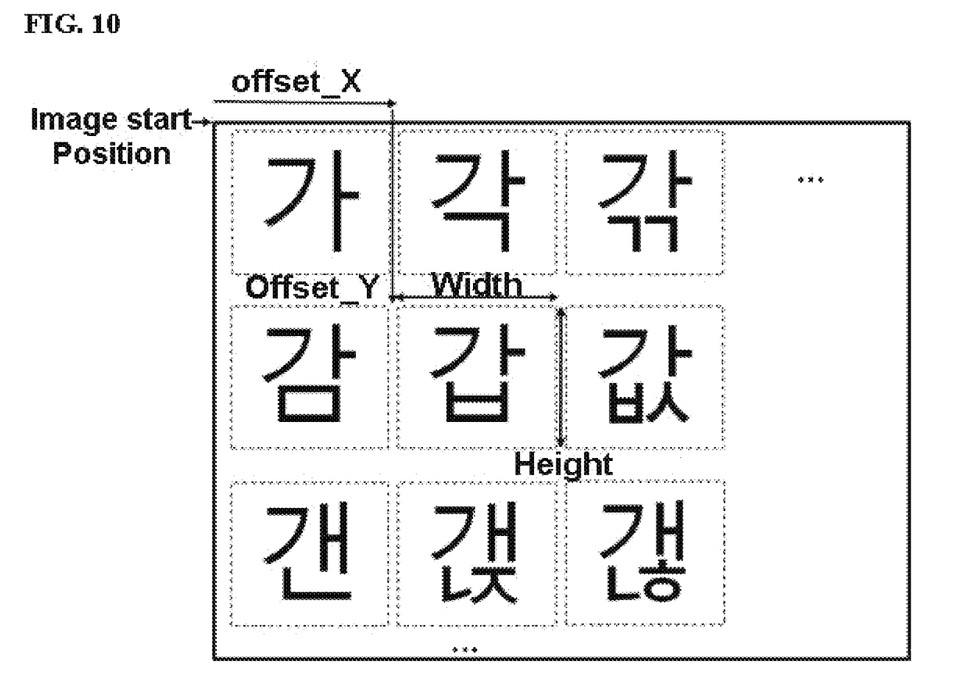
FIG. 10 is a block diagram of image file divided into pages in FIG. 9.

FIG. 9 relates to character string image applied to this invention and is an illustration of character string image applied to this invention, stored as image file by dividing code for Korean language in Unicode into pages. In FIG. 9, image coordinate information (offset_x, offset_y, width, height) within bitmap font image is used based on image file divided into pages to find and copy image of target character and display on instrument display unit.

FIG. 10 is a block diagram of image file divided into pages in FIG. 9. In FIG. 10, character string is formed by searching coordinate information (offset_x, offset_y, width, height) of each page and copying character image that matches coordinates of corresponding character to be displayed on instrument display unit.

Figure 11:
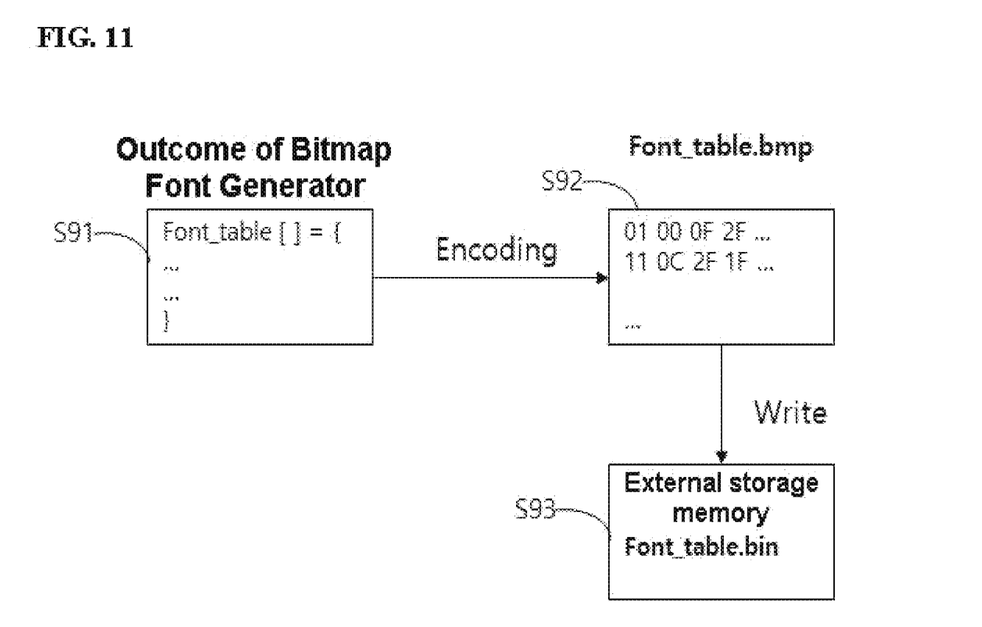
FIG. 11 is an illustration explaining font table image to store font table applied to this invention in external storage memory.

FIG. 11 is an illustration explaining font table image to store font table applied to this invention in external storage memory. FIG. 11 shows that font table image processes address, horizontal size, and vertical size information into binary form to store font table written in programming language in external storage memory. Binary form is characterized by fast search speed. Also, shortage of internal memory caused by storing in internal memory is resolved by storing font table information in external storage memory as image type. Also, font table image was not compressed considering performance of MCU. Image type uses uncompressed type such as BMP and TGA. In most cases, image is converted using tool provided or approved by MCU manufacturer and extension is changed to BIN to be stored in external storage memory. Also, as explained in FIG. 10, font table image stored in external storage memory is analyzed. When letter 'Gab' is searched, coordinate information of corresponding character image in bitmap font image such as offset_x, offset_y, width, and height is acquired. If letter 'Gab' cannot be found, position information of blank or designated inexpressible character like ? is transmitted.

What is claimed is:

1. A digital instrument display method of a vehicle to display data generated by each sensor unit of the vehicle on a vehicle instrument panel, the digital instrument display method comprising:
    a step (S11) in which a bitmap font image and a font table are generated for fonts to be used and are stored in an external storage memory before a CPU runs an application module;
    a step (S12) in which the CPU runs the application module;
    a step (S13) in which the application module runs a graphic engine module;
    a step (S14) in which the graphic engine module runs and operates a content module;
    a step (S15) in which each sensor unit attached to the vehicle transmits generated signals to the application module when a digital instrument display apparatus is operated;
    a step (S16) in which the application module analyzes received information, generates external event data that have information identifiers and values, and stores the external event data in an internal memory;
    a step (S17) in which the content module reads the external event data stored in the internal memory for each frame and determines whether the external event data is a character string;
    a step (S18) in which if the external event data is the character string, the content module transmits corresponding character string information to the graphic engine module;
    a step (S19) in which the graphic engine module acquires position and size information of a bitmap font image that matches the character string from the font table stored in the external storage memory; and
    a step (S20) in which the CPU copies the position and size information of the bitmap font image that matches the character string and displays the character string, through an instrument display unit using the graphic engine module and a graphic library,
    wherein the content module comprises Stage, Layer, Sprite, Shape, and TextField to display the character string.

2. The digital instrument display method of claim 1, wherein if the external event data is not the character string in S17, the digital instrument display method further comprises:
    a step (S21) in which the content module transmits corresponding image address information stored previously to the graphic engine module; and
    a step (S22) in which the graphic, engine module loads and displays on the instrument display unit an image stored in the external storage memory that matches the image address information.

3. The digital instrument display method of claim 2, wherein the font table containing position information of each character included in the bitmap font image is converted into a font table image, and the font table image is stored in binary form in the external storage memory.

4. The digital instrument display method of claim 3, wherein the font table image is of a file format of BMP or TGA.

5. The digital instrument display method of claim 1, wherein the font table containing position information of each character included in the bitmap font image is converted into a font table image, and the font table image is stored in binary form in the external storage memory.

6. The digital instrument display method of claim 5, wherein the font table image is of a file format of BMP or TGA.

7. A digital instrument display apparatus of a vehicle to display data generated by each sensor unit of the vehicle on a vehicle instrument panel, comprising:
    a CPU (100) that runs an application module, copies size and position of a bitmap font image that matches an acquired character string from an external storage memory, and controls to display on an instrument display unit using a graphic engine module and a graphic library or controls to display image information received from a content module on an instrument panel;
    the application module (200) that runs the graphic engine module, receives signals from each sensor unit, analyzes received information to generate external event data with information identifiers and types (values), and stores the external event data in an internal memory (RAM, EEPROM);
    the graphic engine module (300) that runs the content module, receives a character string from the content module, acquires position and size information of a bitmap font image that matches the character string from a font table stored in the external storage memory, and receives corresponding image information stored previously from the content module;
    the content module (400) that receives the external event data stored in the internal memory for every frame and determines whether the external event data is a character string, transmits corresponding character string information to the graphic engine module if the external event data is the character string, and transmits corresponding image address information stored previously to the graphic engine module if the external event data is not the character string;
    the graphic library (500) that stores screen components provided by a microcontroller unit (MCU) manufacturer;
    the external storage memory (600) that stores the bitmap font image and the font table for fonts to be used;
    each sensor unit (700) that generates sensor information and transmits the sensor information to the application module;
    the instrument panel (800) that displays the bitmap font image or displays an image according to control of a control unit;
    a timer (900) that provides time information to the CPU;
    a serial interface (950) that provides an interface between the CPU and the external storage memory; and
    an I/O (970) for external data input and output,
    wherein the content module comprises Stage, Layer, Sprite, Shape, and TextField to display the character string.

8. The digital instrument display apparatus of claim 7, wherein the external storage memory (600) stores a font table image which the font table containing position, size, and search information of each character included in the bitmap font image is converted into and is stored in binary form in external storage memory.

9. The digital instrument display apparatus of claim 8, wherein the font table image is of a file format of BMP or TGA.

* * * * *